US010061928B2

(12) United States Patent
Wang et al.

(10) Patent No.: US 10,061,928 B2
(45) Date of Patent: Aug. 28, 2018

(54) SECURITY-ENHANCED COMPUTER SYSTEMS AND METHODS

(71) Applicant: JANUS TECHNOLOGIES, INC., Half Moon Bay, CA (US)

(72) Inventors: Chen-Hua Wang, Taipei (TW); Sofin Raskin, Los Altos, CA (US); Leonid Rozenboim, Los Gatos, CA (US)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 0 days.

(21) Appl. No.: 15/156,210

(22) Filed: May 16, 2016

(65) Prior Publication Data

US 2016/0259940 A1 Sep. 8, 2016

Related U.S. Application Data

(63) Continuation of application No. 14/463,400, filed on Aug. 19, 2014, now Pat. No. 9,342,711, which is a (Continued)

(51) Int. Cl.
*H04L 29/06* (2006.01)
*G06F 21/57* (2013.01)
(Continued)

(52) U.S. Cl.
CPC .......... *G06F 21/572* (2013.01); *G06F 9/4406* (2013.01); *G06F 12/1408* (2013.01); *G06F 21/70* (2013.01); *G06F 21/71* (2013.01); *G06F 21/74* (2013.01); *G06F 21/83* (2013.01); *G06F 21/84* (2013.01); *H04L 63/0272* (2013.01);
(Continued)

(58) Field of Classification Search
CPC ........... G06F 21/82; G06F 21/74; G06F 21/31
See application file for complete search history.

(56) References Cited

U.S. PATENT DOCUMENTS 5,896,499 A 4/1999 McKelvey
5,946,469 A 8/1999 Chidester
(Continued)

FOREIGN PATENT DOCUMENTS

CN 1702593 A 11/2005
CN 102118393 A 7/2011
(Continued)

OTHER PUBLICATIONS

Garfinkel, "Terra: A Virtual Machine-Based Platform for Trusted Computing", ACM SOS, Proc. of the ACM Symp. on Operating system Principles, Oct. 22, 2003m oo, 193-206.
(Continued)

*Primary Examiner* — Jason K Gee
(74) *Attorney, Agent, or Firm* — Foley & Lardner LLP

(57) ABSTRACT

In general, the invention provides a computer architecture designed for enhanced data security. In embodiments, the architecture comprises two sub-systems, each with their own processing units and memories, and a defined set of interfaces that interconnect the two sub-systems and the external world. One sub-system is designed to provide a familiar environment for running computer applications. The other sub-system is designed to provide a secure bridge between the first sub-system and users via input and output devices.

20 Claims, 6 Drawing Sheets

Related U.S. Application Data continuation of application No. 13/396,582, filed on Feb. 14, 2012, now Pat. No. 8,813,218.

(51) Int. Cl.

| | | |
|---|---|---|
| *G06F 21/70* | (2013.01) | |
| *G06F 21/71* | (2013.01) | |
| *G06F 21/74* | (2013.01) | |
| *G06F 21/83* | (2013.01) | |
| *G06F 21/84* | (2013.01) | |
| *G06F 9/4401* | (2018.01) | |
| *G06F 12/14* | (2006.01) | |
| *G06F 21/82* | (2013.01) | |

(52) U.S. Cl.
CPC ............ H04L 63/123 (2013.01); *G06F 21/82* (2013.01); *G06F 2212/1052* (2013.01)

(56) References Cited

U.S. PATENT DOCUMENTS

| | | | |
|---|---|---|---|
| 6,480,932 B1* | 11/2002 | Vallis | G06F 3/0623 |
| | | | 711/112 |
| 7,987,497 B1 | 7/2011 | Giles et al. | |
| 8,402,529 B1* | 3/2013 | Green | H04L 63/1416 |
| | | | 726/11 |
| 2002/0007456 A1 | 1/2002 | Peinado et al. | |
| 2004/0117610 A1* | 6/2004 | Hensley | G06F 21/57 |
| | | | 713/2 |
| 2004/0268147 A1 | 12/2004 | Wiederin et al. | |
| 2007/0192610 A1* | 8/2007 | Chun | G06F 21/64 |
| | | | 713/176 |
| 2008/0263658 A1 | 10/2008 | Michael et al. | |
| 2009/0034722 A1* | 2/2009 | Zaharris | G11B 20/00086 |
| | | | 380/44 |
| 2009/0254986 A1 | 10/2009 | Harris et al. | |
| 2010/0125741 A1* | 5/2010 | Rausch | G06F 21/10 |
| | | | 713/193 |
| 2010/0192230 A1 | 7/2010 | Steeves et al. | |
| 2011/0102443 A1 | 5/2011 | Dror et al. | |
| 2011/0131423 A1 | 6/2011 | Ponsini | |
| 2011/0199308 A1 | 8/2011 | Nativel et al. | |
| 2011/0208963 A1* | 8/2011 | Soffer | G06F 3/023 |
| | | | 713/168 |
| 2013/0067534 A1 | 3/2013 | Soffer | |

FOREIGN PATENT DOCUMENTS

| | | |
|---|---|---|
| CN | 102194293 A | 9/2011 |
| JP | 2000-285025 | 10/2000 |
| JP | 2003-122640 | 4/2003 |

OTHER PUBLICATIONS

Landau, et al., "SlitX: Split Guest/Hypervisor Execution on Multi-Core", 3$^{rd}$ Workshop of IO Virtualization, Jun. 14, 2011. 7 pages.

European Search Report for EP Application No. 13154870, dated Apr. 30, 2013.

* cited by examiner

SECURITY-ENHANCED COMPUTER SYSTEMS AND METHODS

CROSS-REFERENCE TO RELATED APPLICATIONS

The present application is a continuation of U.S. application Ser. No. 14/463,400, filed Aug. 19, 2014, now U.S. Pat. No. 9,342,711, which is a continuation of U.S. application Ser. No. 13/396,582, filed Feb. 14, 2012, now U.S. Pat. No. 8,813,218, the contents of all such applications being incorporated by reference herein in their entirety.

FIELD OF THE INVENTION

The present invention relates generally to computers, and in particular to computers used in corporations and government organizations where information security is of elevated importance.

BACKGROUND OF THE INVENTION

Traditionally, personal and corporate data security functions are implemented in the form of add-on software modules on top of a hardware architecture essentially identical to consumer-grade personal computers, which are designed for affordability. Sometimes security-specific add-on hardware modules are also implemented, e.g. for the purpose of authenticating the user more securely (e.g. smart cards, biometrics). But even in these cases the bulk of the security functionality is implemented traditionally as add-on software components that are sometimes integrated into the operating system but mostly reside in memory and are executed just like any other software application.

A significant problem with this traditional approach is that when the security functionality is implemented in software, it may be compromised in a number of different ways. In the normal course of operating a computer, the user occasionally adds or modifies some software components—this is the ability to add and replace software components that gives the general purpose computing architecture its flexibility and usability in a wide variety of tasks and assignment. It is this same ability to modify or add software modules that opens a window of opportunity for an attacker to compromise the security of the computer system.

When a new software component is introduced, there is a risk that it includes a functionality intended for effecting an attack, or that it includes a programming error that could be exploited externally to facilitate an attack. Also, because the security software is distributed and installed similarly to application software, it is also vulnerable to the same risks.

In a traditional general-purpose computer the entire random-access memory (RAM) is organized in a single large uniform bank that can be physically accessed by processor, or by all processors if the system contains a plurality of processors. The uniformity of memory access provides the most flexibility in the usage of RAM, which is one of the critical resources in the computer, and leads to the most optimal utilization of RAM by the operating system and application software. While effective for cost efficiency, the uniform RAM architecture also means that programs running concurrently can access each other's memory regions, or the memory occupied by the operating system or its components. As such, this feature of the uniform RAM architecture has been the most used vehicle of compromising a computer's security.

Modern computer systems also employ a mechanism called "virtual memory", where a hardware component embedded in the processor called a memory management unit ("MMU") performs a function of memory address translation. The addition of virtual memory allows the RAM to be partitioned into sections, each section dedicated to a certain software component or a group thereof. Virtual memory also prevents inadvertent access to the memory that belongs to a different software component or the operating system. The virtual memory mechanism has proven quite effective to prevent erroneous software behavior from impacting the stability of the system as a whole, but it was not intended to prevent malicious sabotage, and in every operating system there is a documented mechanism to circumvent the protections furnished by the MMU meant for diagnostic purposes. These mechanism are often exploited to compromise the security of the computer and the data contained therein.

In one conventional approach to achieve an elevated level of security, some portion of the security mechanism is implemented in a separate and dedicated hardware module, which is designed with additional tamper-resistant features and thereby adds a difficulty level to the potential intruder. Perhaps one of the earliest non-classified examples of hardware-enhanced computer security features was the IBM HSM (Hardware Security Module), which was a small stand-alone computer with its own memory and storage subsystem which was built into a rugged enclosure designed similarly to an office safe. The Personal Identification Numbers of bank cards were stored in the HSM such that even the bank employees did not have access to these codes in clear-text form. When a automated teller machine needed to verify the identify of a card holder, a cryptographic challenge-response sequence was initiated such that the PIN was never transmitted verbatim over the communication links, and the HSM performed the verification process securely.

The smart-card approach user-authentication mechanism of the global standard cellular phone system (based on GSM) has a similar mechanism, except that the hardware security module is miniaturized to the size of a finger nail, and each user is furnished with such a device. The SIM card construction makes it difficult to disassemble without damaging the embedded memory chip.

Another conventional approach is the Truster Platform Module that is built into some of the personal computers presently manufactured. The TPM is somewhat similar to a SIM card in that it is a small memory chip that has restricted access, and contains some security-related identification information and some encryption keys. The pivotal idea of the TPM is to prevent an attacker from modifying this identification information to falsely identify the computer or its user and thus circumvent the security mechanisms present elsewhere in the system. Its down side however is that the keys and numbers contained in the TPM are just one part of the protection, while the rest of the parts are implemented traditionally in the operating system and application software components. Thus the TPM does provide an additional layer of protection, making it impossible to modified some key security-related information token by an unauthorized user. However, the TPM leaves significant vulnerabilities in the other parts of the system software and its communications that can be exploited for a successful attack.

Accordingly, a need remains for improved approaches to computer system security.

SUMMARY OF THE INVENTION

The present invention relates to a computer architecture designed for enhanced data security. In embodiments, the architecture comprises two sub-systems, each with their own processing units and memories, and a clearly defined set of interfaces that interconnect the two sub-systems and the external world.

According to certain aspects, one of the two subsystems is built around a popular processor architecture, such as the x86 which runs the majority of today's personal computers, and is designated as the application-processor subsystem. This processor architecture is chosen for the wide variety of application software and operating systems that are available for it, and aims to maximize the flexibility of the user to install application software of their choice. Unlike a conventional personal computer that is also designed around the x86 architecture, this application-processor has all its peripheral connections routed to the other subsystem instead of to the actual external or internal peripherals. Accordingly, while the software that could run on the x86 is virtually unrestricted, external access to this software or its data is strictly controlled by a dedicated system-processor subsystem which enforces the protections necessary to keep these applications and their data safe.

According to certain additional aspects, the other subsystem, designated as the system-processor, is essentially an embedded software system. It runs an embedded software system furnished along with the processor, and can not be modified by the end-user of the computer under any circumstances, and should be instead referred to as firmware. Being an embedded system, the specifics of the processor architecture of the system-processor module are of no consequence, as neither the end-user nor any third party developer is allowed to write or modify any of its software components. The system-processor essentially serves as a "bridge" between the inherently insecure application software environment running on its own hardware subsystem and the external world. In embodiments, the system-processor has two ports for each type of peripheral connection, one connected to an actual peripheral and the other to the application-processor sub-system. The firmware along with the system-processor hardware emulates each type of peripheral device for the benefit of the application-processor subsystem, while enforcing a set of rules and mechanisms appropriate for each of the supported types of peripherals, and necessary to maintain the highest level of protection for the application software and its data at all times. All the internal and external peripherals are connected to the system-processor and are used by the peripheral emulation firmware functionality.

In accordance with these and other aspects, a computer system according to embodiments of the invention includes a first subsystem including a first processor configured to run applications; a second subsystem including a second separate processor configured to run security firmware; and peripherals connected to the second subsystem, wherein access to the peripherals by the applications is controlled by the security firmware running on the second processor which emulates corresponding peripheral connections of the first subsystem.

In further accordance with these and other aspects, a method of securing a computer system according to embodiments of the invention includes configuring a first subsystem of the computer system including a first processor to run applications; configuring a second subsystem of the computer system including a second separate processor to run security firmware; connecting peripherals to the second subsystem; and controlling access to the peripherals by the applications using the security firmware running on the second processor which emulates corresponding peripheral connections of the first subsystem.

In additional furtherance of these and other aspects, a system according to embodiments of the invention includes a stand-alone computer system including: a first subsystem including a first processor configured to run applications, and a second subsystem including a second separate processor configured to run security firmware; and a secure intranet hosted by an organization that controls the stand-alone computer system, wherein access to the secure intranet by the applications is controlled by the security firmware running on the second processor which emulates a corresponding physical network connection of the first subsystem.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the invention provides a computer architecture designed for enhanced data security. In embodiments, the architecture comprises two sub-systems, each with their own processing units and memories, and a defined set of interfaces that interconnect the two sub-systems and the external world. One sub-system is designed to provide a familiar environment for running computer applications. The other sub-system is designed to provide a secure bridge between the first sub-system and users via input and output devices.

Figure 1:
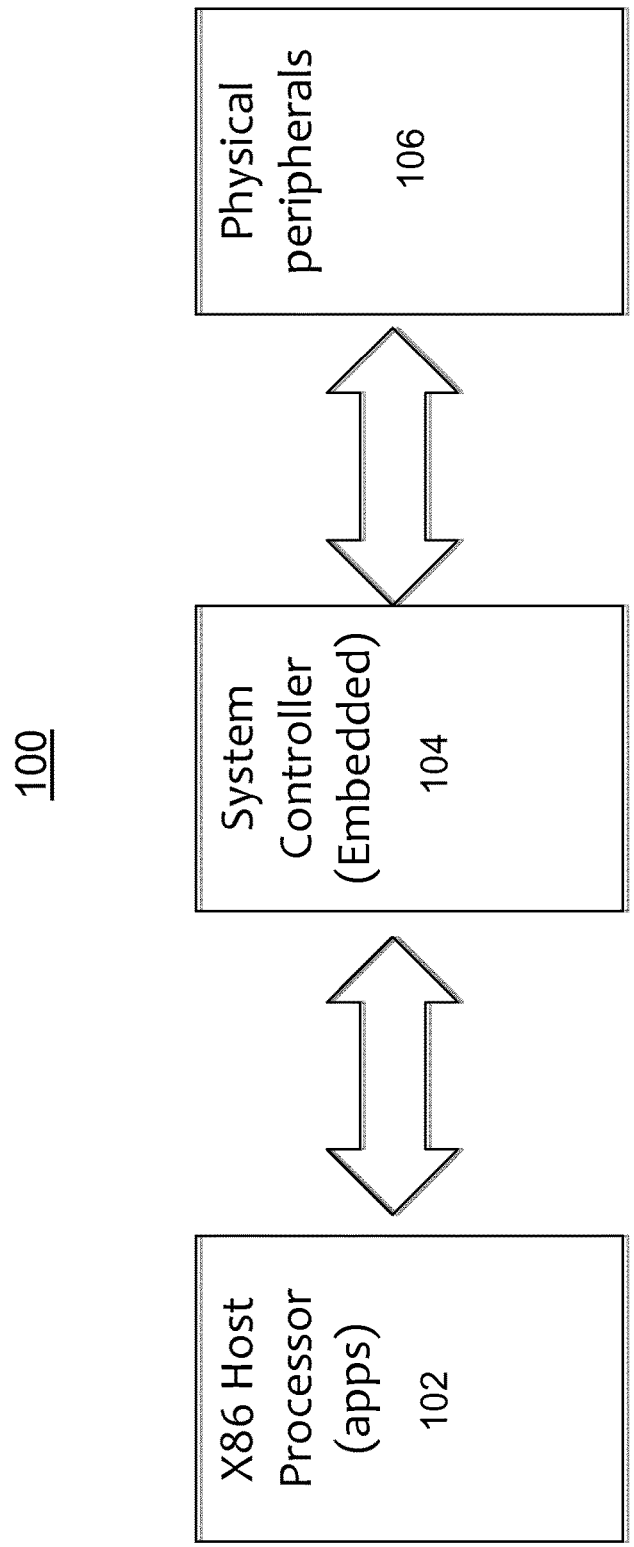
FIG. 1 is a top-level diagram illustrating a secure computer architecture according to embodiments of the invention.

FIG. 1 is a block diagram illustrating an example system architecture 100 according to aspects of the invention.

As shown in FIG. 1, one of the two subsystems is preferably built around a popular microprocessor architecture, such as the x86 which runs the majority of today's personal computers, which is designated as the application-processor subsystem 102. This architecture is chosen for the wide variety of application software and operating systems that are available for it, and aims to maximize the flexibility of the user to install application software of their choice. Unlike a conventional personal computer that is also designed around the x86 architecture, this application-processor has all its peripheral connections routed to the other subsystem instead of to actual external or internal peripherals. So while the software that could run on the x86 is virtually unrestricted, external access to this software or its data is strictly controlled by a dedicated system-processor sub-system which enforces the protections necessary to keep these applications and their data safe.

This other sub-system, system-processor 104, is preferably an embedded system. As such, it runs a designated software system furnished together with the processor, and can not be modified by the end-user of the computer under any circumstances, and should be instead referred to as firmware. Being an embedded system, the specifics of the processor architecture of the system-processor module are of no consequence, as neither the end-user nor any third party developer is permitted to write or modify any of its software components. The system-processor 104 essentially serves as a "bridge" between the inherently insecure application software environment running on its own hardware subsystem 102 and the external world.

Peripherals 106 typically include any type of device that provides an interface between the functionalities of system 100 and a computer user. Such devices can include output devices such as displays, speakers, printers, etc. and input devices such as keyboards, mice, touchpads, touchscreens, etc. The number and type of peripherals 106 can depend on the particular form factor of a device that houses application processor 102 and 104. For example, in embodiments of the invention where the form factor is that of a conventional desktop computer, the peripherals 106 can include a display, a keyboard and a mouse, which are externally attached. Where the form factor is that of a conventional notebook computer, the peripherals 106 can include an integrated display, keyboard and touchpad. Where the form factor is that of a tablet computer or smart phone, the peripherals 106 can include an integrated display/touchscreen. It should be noted that peripherals 106 between different types of form factors for system 100 are not necessarily mutually exclusive, nor are they constant over time. For example, many conventional touchpad computer systems may be operated with optional separate keyboards and mice (e.g. connected through USB or Bluetooth). Likewise, many conventional desktop computer systems may be operated with optional touchscreens or voice-command devices.

In some embodiments, system 100 is designed to appear as a normal computer system, with the additional security features of system processor 102 embedded therein and not readily apparent to the casual observer. For example, system 100 can appear as a normal laptop computer with a conventional folding display and built-in keyboard, speakers and pointing device. In other possible embodiments, system processor 102 and application processor 104 are housed separately, either together with, or further separately from certain of peripherals 106. However, it should be noted that for additional security aspects, processor sub-systems 102 and 104 are preferably integrated as much as possible, within the same enclosure and even on the same circuit board, and perhaps even as two separate processor cores on the same ASIC, SOC or FPGA. For example, the present inventors recognize that any type of exposed interconnections between these subsystems may potentially be exploited by an attacker. Accordingly, such interconnections are preferably made as difficult to access as possible (e.g. within the same integrated circuit and/or circuit board). As for the peripheral 106 connections to the system processor 104, these can be either integral or separate according to the particular form factor of system 100.

It should be noted that it is not necessary for all peripherals of any given system 100 to have access controlled by system processor 104. Typically, however, at least the most useful or important peripherals of the system 100 are controlled, such as all input devices such as keyboards and mice, as well as most useful output devices such as displays. In this regard, the present inventors recognize that such peripherals typically include those input/output devices through which a particular implementation of application processor 102 is able to interface with a human operator or with other computers (e.g. via a network or other communications link) to control or access its operations and/or data. As such, all peripherals 106 that substantively expose the data and operations of application processor 102 to the external world are preferably routed through the system processor 104. Accordingly, the term "peripheral" should be construed as encompassing both an actual peripheral and a connection (e.g. port) that connects a processor to a peripheral. The system processor 104 thus preferably intercepts communications between peripherals 106 and processor 102 at the most secure physical point in these communications. In other words, the application processor 102 does not have any important peripherals connected to it or its operating environment directly or through connections that are exposed or accessible externally; rather these connections are routed through or controlled by the system processor 104.

It should be further noted that, perhaps depending on the type, peripherals 106 can be internal or external to a device that commonly houses application processor 102 and system processor 104. One preferred embodiment of a system 100 that will be described in more detail below, but which should not be considered limiting, is that of a device in the form factor of a desktop or notebook computer. In such an embodiment, peripherals 106 include an attached display, keyboard and pointing device (e.g. touchpad and/or stick mouse), and internal speakers and wireless modem (e.g. 802.11 a/b/g/n). Peripherals 106 in such an embodiment can further include any input or output external device that is attached via a corresponding jack on the system 100, including conventional jacks or interfaces such as USB, RJ-45, Firewire, eSATA, VGA, HDMI, DVI, DisplayPort and MiniDisplayPort. Those skilled in the art will recognize how to implement the invention with fewer or additional types of interfaces and/or peripherals 106 after being taught by the present examples.

The system-processor 104 typically has two connections for each type of peripheral connection, one to an actual peripheral 106 and the other to the application-processor sub-system 102. As will be described in more detail below, the firmware provided with the system-processor 104 hardware emulates each type of peripheral device 106 that is actually connected to system processor 104 for the benefit of the application-processor subsystem 102. The firmware further preferably enforces a set of rules and mechanisms that are both appropriate for each of the supported types of peripherals, and necessary to maintain the highest level of protection for the application software and its data at all times. In embodiments, all the internal and external peripherals 106 are connected to the system-processor 104 and are used by the peripheral emulation firmware functionality.

Although not shown in detail in FIG. 1, it should be noted that application processor 102 and system controller 104 can further include memories, memory and I/O addressing space, operating system software, application software, graphics processors, sound processors and processor buses. For example, where the form factor of system 100 is a desktop or notebook computer, system 100 can include conventional personal computer components such as a PCI bus, RAM and ROM memory storing an operating system such as Windows 7, and associated BIOS software and application software such as Windows Office. System 100 can further include such conventional personal computer components such as a XGA graphics processor (e.g. Intel x86, AMD integrated graphics or external processors such as those provided by nVidia), a 5.1 audio processor, USB inputs and outputs, Ethernet interfaces, serial/parallel interfaces, etc. To the extent the control of such components by system processor 104 and their interoperation with application processor 102 is an aspect of the invention, these details will be provided below. However, further additional implementation details of application processor 102 will be omitted for sake of clarity of the invention. Moreover, those skilled in the art will appreciate various alternative embodiments of processor 102 for other types of form factors such as pad computers and smart phones after being taught by these examples.

Example embodiments of system-processor sub-system 104 will now be described in terms of examples of the peripheral types that it emulates and supports, plus a variety of auxiliary functions aimed to support system-level operational logic and security.

Figure 2:
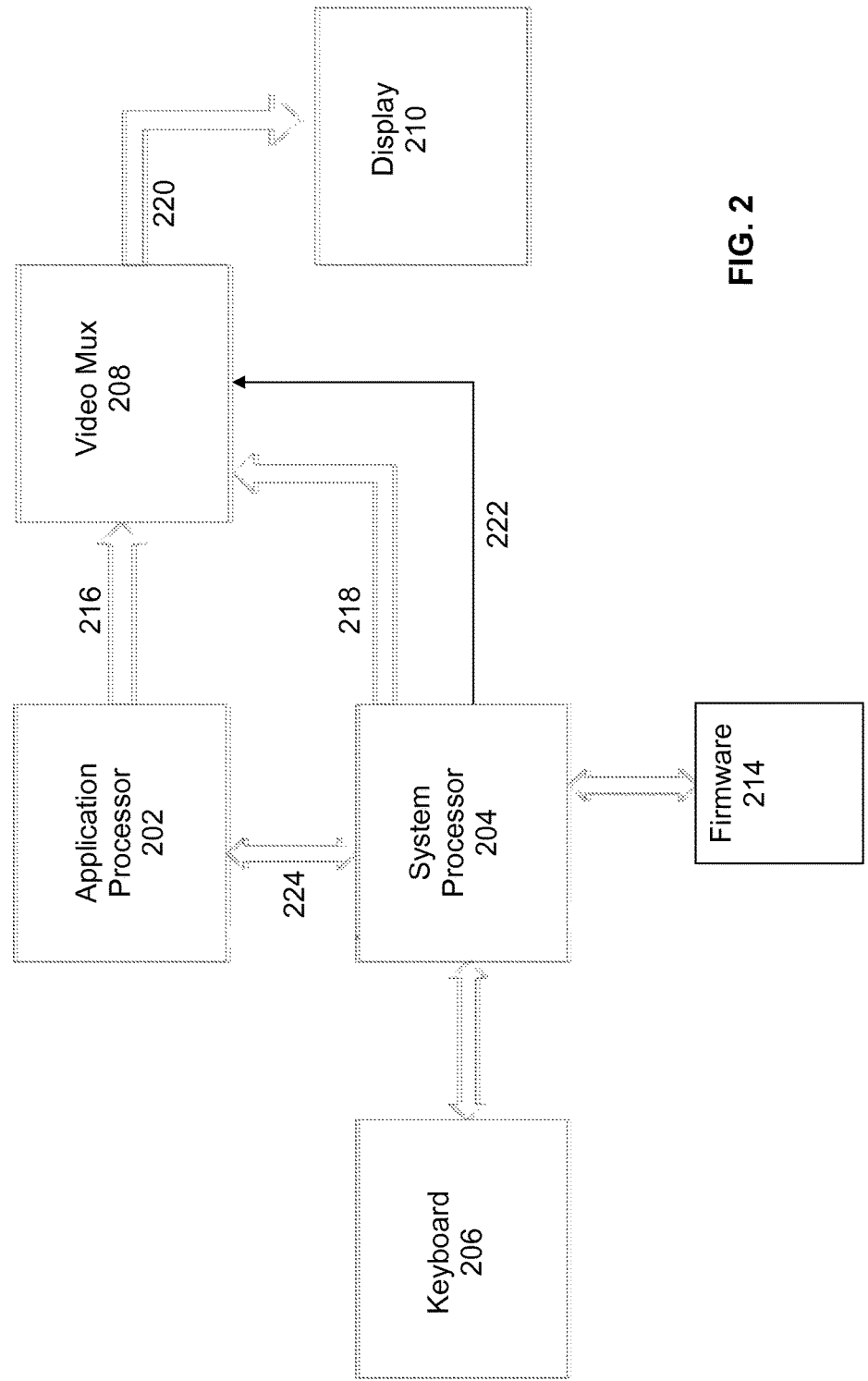
FIG. 2 is a functional block diagram of a computer system in accordance with principles of the invention.

In example embodiments such as that illustrated in connection with FIG. 2, the system 100, system processor 204 is coupled to application processor 202, as well as to keyboard 206, video mux 208 and firmware 214. Application processor 202 can correspond to application processor 102 as described above. System processor 204 can be implemented by any conventional, proprietary or future processor such as an x86 processor, custom ASIC or SOC, ARM processor, etc. Firmware 214 is preferably implemented in ROM (e.g. Flash) that is dedicated to system processor 204 and includes all operating system and application software needed to control system processor 204 and the functionality thereof as described herein and below. Those skilled in the art will recognize that the language and structure of the software comprising firmware 214 can depend on the type of processor used to implement processor 204 and/or the operating system used. Those skilled in the art will further understand how to implement software and firmware implementing the functionality of processor 204, perhaps together with conventional operating systems and applications, after being taught by the foregoing descriptions. It should be further noted that system processor 204 can include additional functions and/or components not shown such as processor buses, RAM/application memory, graphics processor functionality, input/output ports, etc.

As shown, video multiplexor 208 includes at least two inputs 216, 218 and one output 220. The output 220 of the video multiplexor is connected to the computer display 210. One of the inputs 218 of the video multiplexor 208 is connected to a video-graphic module internal to the system-processor sub-system 204, which is used to communicate operational and security related information and interaction with the end-user, as well as for the purpose of any application that is embedded in the system-processor 204 firmware. The other input 216 of the video multiplexor 208 is connected to the output of the video-graphic module of the application processor sub-system 202, so that the graphics generated by applications are directed to the multiplexor 208, and through the multiplexor conditionally to the display monitor 210 under the control of system processor 204 and control signal 222. In embodiments, the multiplexor 208 scales the resolution and adjusts the frame rate of the video inputs such that they are appropriate for the display mode desired and the actual resolution and frame rate of the display monitor 210. Depending on the operational and security mode of the system as determined by system processor 204, the application graphics output 216 may be entirely blocked from the display, displayed as a small window on the monitor 210, or passed through to the full size of the display monitor 210. The graphics 218 of the system-processor 204 itself can also be conditionally routed to the monitor 210 in a variety of ways dependent on the operational and security mode of operation.

In embodiments, during initial system start-up and authentication, video mux 208, under control of system processor 204 via signal 222, causes the entire display 210 to be dedicated to the system-processor 204 graphics. System processor 204 further controls keyboard 206 (and perhaps other input devices such as touchpads, etc.), and the interactions needed to properly authenticate the user, and inform him of the progress and results of this process via display 210. In embodiments, video outputs of the application-processor 202 are not allowed to be viewed until the authentication has been successful, although the operating system and application software may have been active previously on the application-processor 202. Once the authentication has successfully completed and the system processor 204 declares a normal operational mode, it will cause video mux 208 via signal 222 to allow the application graphics from input 216 to take up the entire screen.

In embodiments, system-processor 204 graphics will not be visible most of the time after successful authentication, except when system-level information needs to be conveyed, or a specific key-combination has been pressed that require interaction with the system-processor 204. At such times, video mux 208 can cause the system-processor 204 graphics to be displayed as an overlay over the application graphics. Under special conditions, for example when the user has been authenticated but the application-processor 202 is being activated or restarted, or when an application embedded in the system-processor 204 firmware runs, video mux 208 can cause the application graphics video 216 to be displayed as a small window on the screen 210, so the user can monitor its progress while interacting with the system-processor 204.

Multiplexer 208 is controlled by signal 222 from system processor 204. It can use any conventional, proprietary or future techniques for mixing video and graphics from multiple sources such as chroma-key, overlay, windowing, etc. As such, the implementation details of 208 depend on the particular multiplexing technique used, and so further details thereof will be omitted here for clarity of the invention. In embodiments, where application processor 202 includes a standard XGA graphics controller, the standard XGA interface is used to implement interface 216. It should be further noted that multiplexer 208 can use additional video security functionality described in U.S. application Ser. No. 13/241,073, the contents of which are incorporated herein by reference in their entirety.

Authentication can include any conventional, proprietary or future technique, and those skilled in the art will recognize many possible alternatives. In one non-limiting example, system processor 204 can prompt a user to enter/supply credentials such as username, password, secure key, biometrics (e.g. fingerprint). These credentials can be compared to locally stored credentials, or system processor 204 can forward them to a remote authentication server for comparison. Still further, locally-stored credentials can be time-limited and refreshed or revoked from an external source as needed.

Similar to the provision of application processor graphics 216 to display 210 via mux 208, system processor 204 prevents access of processor 202 to keyboard 206 and other peripherals until authentication succeeds. As will be explained in more detail below, after successful authentication, processor 204 permits emulated access by processor 202 to keyboard 206 and other peripherals via bus 224, as controlled by emulation functionality provided by firmware 214.

Figure 3:
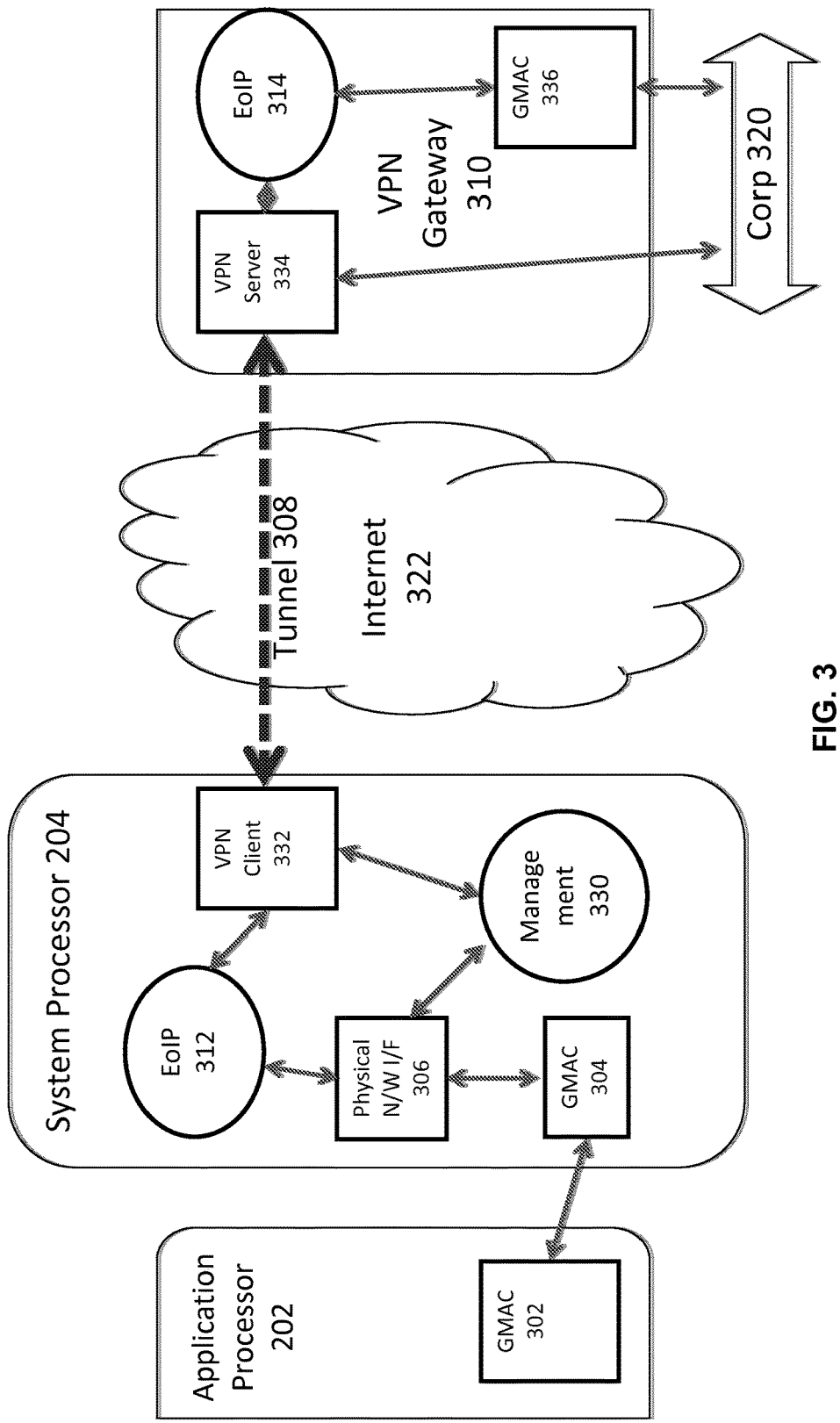
FIG. 3 is a diagram illustrating example aspects of securing a display and startup function of a computer system according to embodiments of the invention.

Example approaches to securing the data networking function of a computer system 100 according to aspects of the invention will now be described. In embodiments, system 100 is a standalone computer that is purchased by a corporation for use by a specific employee. As illustrated in FIG. 3, in these and other embodiments, the corporation preferably further owns/maintains a private network 320 (e.g. an Intranet) interconnected to a public access data network 322 (e.g. the Internet). The private network 320 is preferably secure and sufficiently protected from all relevant threats by a collection of conventional devices such as firewalls, intrusion detection and other forensic and architecture-level protection mechanisms. It is thus an aspect of such embodiments of the present invention to take full advantage of these pre-existing protection measures and benefit from their centralized procurement and management.

In embodiments such as that illustrated in FIG. 3, there are at least two physical networking interfaces on the system-processor sub-system 204. One of these network interfaces, which is typically a Gigabit Ethernet port 304, is connected to a similar port 302 on the application-processor sub-system 202 in a "back to back" configuration, and is the only physical networking connection available to the application-processor 202. Therefore, all traffic originating at an application on processor 202 will be intercepted by the system-processor 204, and any packet directed at the application must first pass through the system-processor 204.

The other of the one or more physical networking interfaces 306 on the system-processor 204 is typically another Gigabit Ethernet. Other types could include wireless network interface modules such as Wi-Fi. Either or both of these interfaces can connect to an available physical network, which can be detected automatically. The network management function 330 of the system processor (preferably implemented in firmware 214) then determines if the network detected can be identified and authenticated. For example, network management function 330 can verify whether the detected network is Intranet 320 of the designated corporation that purchased this computer. For example, network management function 330 can store a range of addresses used within the corporation and can compare the address of the detected network to this range. Network management function 330 can further attempt a connection to one of a list of known servers, retrieve the server cryptographic certificate and verify the certificate against a locally stored certificate database. If authentication passes, and the directly connected network is deemed safe, the system-processor 204 thereafter forwards all packets between the first networking interface 302/304 and the active external interface 306.

Should the authentication process not succeed, or in some cases when an elevated protection level is desired such that the process is entirely bypassed, the available network is deemed insecure, and a virtual private network ("VPN") connection, (a.k.a. VPN Tunnel 308) will be established between a VPN client 332 on the system-processor 204 (preferably implemented in firmware 214) and a VPN server 334 on a designated VPN Gateway 310 on the corporate Intranet 320. Once the VPN Tunnel 308 is established, all traffic to and from the first interface 304 connected to the application-processor 202 will pass through the VPN Tunnel 308 exclusively, so that the application software and its operating system will behave as if the computer was connected locally to the corporate secure network 320 (e.g. Intranet), even when the computer is connected to any other public or private network 308 while moved about by the employee that uses it. A preferred embodiment utilizes the Ethernet over IP protocol 312/314 (where EoIP 312 is preferably implemented in firmware 214) to encapsulate raw Ethernet traffic to and from the application-processor 202 onto the VPN tunnel 308 via VPN client 332. At the server 334 end, the VPN Gateway 310, after decrypting and verifying the packets, will send them on to the corporate Intranet 320. A person competent in the art would appreciate that a VPN Tunnel 308 provides for the encryption of transmitted data packets and verification of the authenticity of these packets using cryptographic signatures. Thus when data packets containing confidential information are exchanged between the application software running on the application-processor 202 within the computer and the corporate data servers, such data is protected from eavesdropping or en-route data modification while in transit on a public access network 322 link.

In embodiments, applications that are embedded in firmware 214 of the system-processor 204 have access to the same VPN tunnel 308, as well as directly to the locally available network 322. So if an embedded application is to transmit any sensitive information, it ought to run its traffic via the VPN Tunnel 308. Nevertheless, in certain example embedded applications such as a video-conferencing agent, controller 204 could allow the user to select a secure connection going through the VPN Tunnel 308 to the corporate network, and from there onward through potentially via another VPN Tunnel, and display an indicator that the connection is secure. Additionally or alternatively, when (for example, for performance reasons) the secure connection is not desired, the controller 204 could allow the user to establish a video-conferencing connection by directly accessing the locally available network 322, and indicate to the user that the connection is not secure, and the user should avoid discussing any sensitive information.

Other applications embedded in firmware 214 of the system-processor 204 may include applications for backing-up and synchronizing the virtual disk image (described in more detail below), and would thus communicate to a corporate storage server via the same VPN Tunnel 308 described above.

Figure 4:
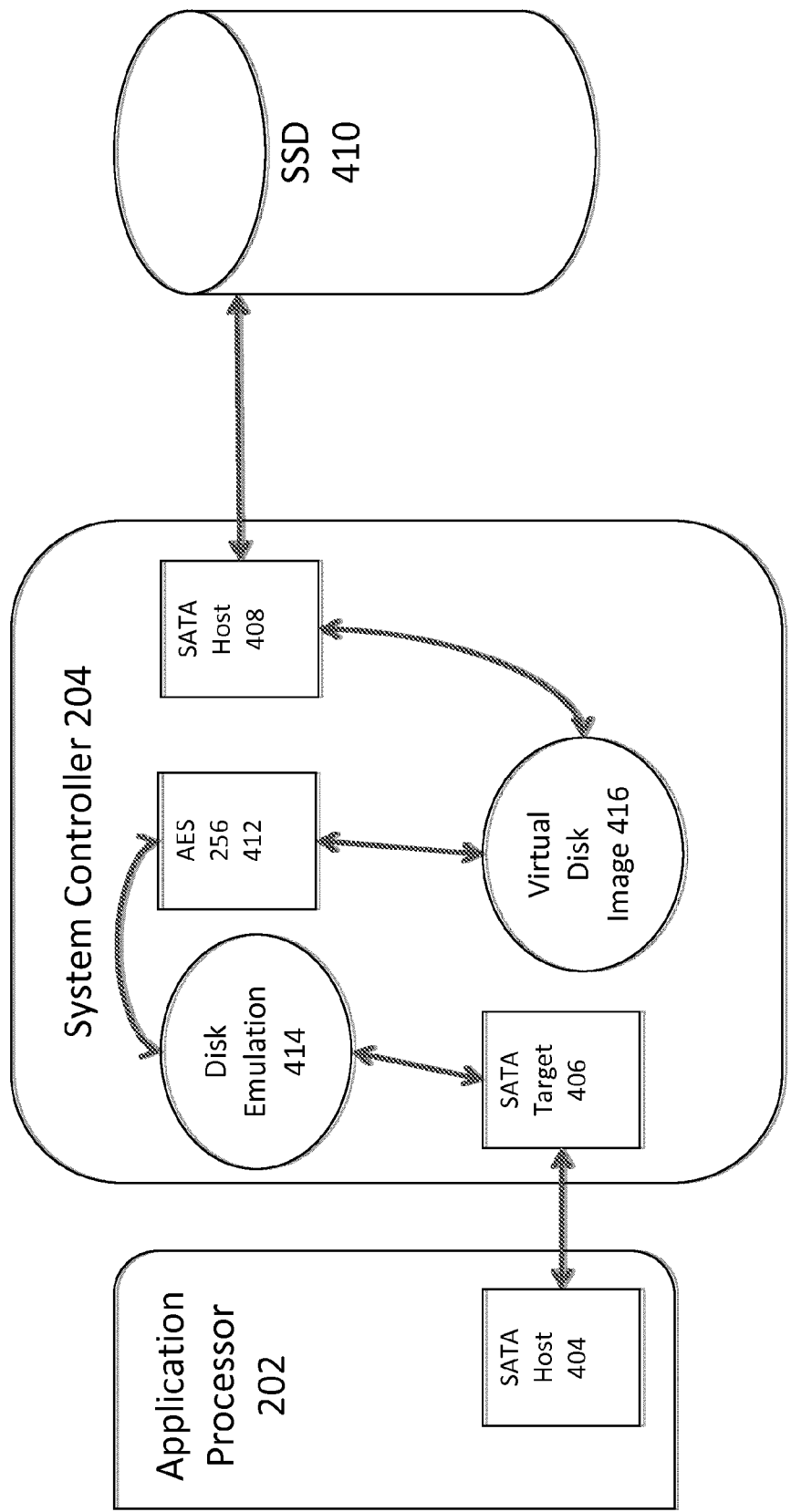
FIG. 4 is a diagram illustrating example aspects of securing a network connection function of a computer system according to embodiments of the invention.

An important peripheral for present-day computers is the disk drive, and so example methods of controlling access to this peripheral according to the invention will now be described in connection with FIG. 4. As shown in FIG. 4, the trend is to replace magnetic media-based rotating disks with Flash memory-based Solid State drives 410. As is known, the drive is typically where a conventional computer maintains all of its software and important portions of its data. When a computer is powered-up, small low-level firmware running from read-only or Flash memory, usually called "BIOS" for "Basic Input/Output System, will initialize the memory and disk drive and will proceed to load operating system software from the disk drive to the main memory, a process called "boot-strapping" or "booting". Once the operating system has commenced execution, it continuously accesses the disk drive to read application software and software libraries, device drivers and configuration files.

When an operating system implements any security-related mechanisms, the keys and passwords used in these protection elements are also stored on the same disk. Any software application that needs to operate in a stand-alone environment, when networking is unavailable, will need to store all of its data as well as executable code and configuration data on the disk drive. For these and other reasons, the disk drive is in need of protection from various potential threats, most notable of which is the potential of theft of the disk drive itself or along with the entire computer, and a subsequent extraction of the data it contains. It is increasingly common for present computers to encrypt the data stored on its disk drive, where the entire content of the disk is encrypted with a single key. This makes the data vulnerable in case this single key is compromised, and at the same time it creates a new potential problem: if the computer user forgets or loses access to the encryption key, neither the corporation nor the employee assigned this computer will be able to retrieve any data on the disk any longer.

One aspect of the computer architecture disclosed herein lies in the way that the disk drive is implemented. In embodiments such as that illustrated in connection with FIG. 4, the application-processor 202 that runs the application software and the operating system is not required to implement any security protection measures, and does not have direct access to the actual disk drive 410 of the computer. Instead, the mass-storage peripheral connection of the application-processor 202, typically a Serial-ATA (or "SATA") Host controller 404, is connected to a compatible interface on the system-processor 204, namely a Serial-ATA Target interface 406. This interface 406 responds to standard ATA commands issued by the application-processor 202, and together with the system-level firmware 214, provides the application processor 202 an emulated disk drive 414. The process of emulating a disk drive implemented by firmware 214 can be similar to the techniques deployed in virtualized environments—the emulated disk drive 414 is actually a collection of files stored in a specific format on an actual disk drive 410. The system-processor 204 hence will have a second mass-storage interface 408 which connects it to a real disk drive (e.g. a magnetic or other media HDD), or more preferably a Solid State Disk Drive ("SSD") 410. Such a SSD (e.g. implemented by Flash memory or other non-volatile memory technologies such as ferroelectric RAM and phase-change RAM) offers improved performance over magnetic drives, and will essentially mask any performance degradation that the emulation process and the encryption described below may impose.

In the illustrated example architecture, the firmware 214 of the system-processor 204 maintains a map of one or more emulated disk drives 414 as a collection of files and a main index file, which in turn are stored over a file system in a specific format on a real disk drive 410. There are several reasons that the emulated disk drive 414 should span multiple files. First, rarely is a disk drive utilized in its entirety, and hence there is no need to allocate any storage space on the real disk drive for the storage space that is unused. Thus, separating the provisioned space of the emulated drive 414 onto a collection of files allows a sparse handing of its address space, and the omission of actual storage for areas that are not being used. Second, at certain times there is a need to maintain a consistent image 416 of an emulated drive that corresponds to its content at a certain point in time, which is known as a check-point, and all subsequently modified data will then be written to new and separate files on the real drive, so that even while the emulated disk 414 is continuously used, its contents at the time of the check-point remain available. There are a variety of reasons why check-pointing is required, one of which is the ability to backup or synchronize the contents of the disk on a central corporate data storage vault, and prevent loss of data in the event the computer is lost or damaged. The check-pointing and backup functionality are implemented by the firmware 214 of the system-processor 204, and are thus independent of the operating system or application software of processor 202. Moreover, as the system-processor 204 consumes significantly less power than the application-processor 202, if the computer is not being actively used but needs to perform a periodic backup process, there is no need to apply power to the application-processor 202, as the computer is fully capable of communicating with the corporate backup servers and securely transmit the newest areas of the emulated disk 414 to the server independently.

The data of the emulated disk 414 is preferably encrypted when stored on the real disk drive. To avoid confusion, the data blocks exchanged between the application-processor 202 and system-processor 204 are not encrypted, and are transmitted in clear-text. This data is then encrypted by process 412 (e.g. using AES 256) before being written to the real solid-state disk drive 410. The encryption key used for the encryption of emulated disk data is preferably at no time present in the memory space of the application-processor 202, and thus any attack aimed at this encryption key by means of implanting malicious software onto the computer is rendered ineffective. Even inside the system-processor 204, the emulated-disk 414 encryption key should never be stored in the main memory, but instead a separate memory space intended for encryption keys should be used to store these keys during normal operation. The specially protected key-storage memory is preferably also made with non-volatile memory technology so that these keys never need to be stored on the real solid-state disk drive 410 either, and are instead held inside the one of the chips making up the system-processor 204.

For an additional improvement of the emulated disk protection level, since the emulated disk 414 data is stored in a plurality of files, it is desirable to designate a specific encryption key to each of these files, so that if the real drive does get stolen, the amount of time that will be needed to compromise the entire disk will be multiplied. During normal operation, all the encryption keys used by any of the files representing the emulated disk are preferably present in the system-processor 204 designated security-module memory.

During the backup process, the firmware 214 will decrypt the emulated disk data 414, compress it and re-encrypt it for transmission using the VPN Tunnel encryption protocol and keys mentioned above. In this way, there is never a need to transmit the emulated disk encryption keys over the network or store them on the corporate server, thus minimizing the risk of compromising the data of all corporate computers in the event one of these servers is compromised. If however a computer gets lost or damaged, the data stored in its emulated disk 414 is securely maintained on one of the corporate servers, and a new computer can be quickly provisioned to the same user and restored to full operation by copying the emulated disk image 416 to the new computer.

In order to minimize the impact of disk emulation on the performance of the application-processor 202 and its software, the system-processor 204 should be able to perform several mass-storage commands concurrently. This can be implemented using the Native Command Queuing feature of the Serial-ATA command set. Hence there could be several storage-related activities happening all at once: a storage command is received by the SATA-Target hardware 406 into the memory; a number of data blocks in memory are being encrypted or decrypted by block 412; and another storage command is being executed on the SATA-Host interface 408 that connects to the real drive, all at the same time, so there may be at least three storage operations processed by the system-processor 204 at the same time. This will effectively mask the delay that is inevitable in the added complexity of handling these commands while emulating a disk drive 414, as long as the application-processor 202 and the operating system it is running is capable of issuing additional storage commands before receiving a response to the first one.

The peripherals that do not belong to the above described groups, and optionally some that do, are commonly interfaced using the Universal Serial Bus (USB). Example methods of providing secure access to these peripherals according to aspects of the invention will now be described in connection with FIG. 5. Such peripherals can include keyboards, mice, printers, wireless modems, card readers, external disk drives and a variety of application-specific I/O devices. As is known, the peripherals that can be connected via USB belong to a number of categories, each possibly with its unique implication on security of the computer system. Some USB peripherals can be considered reasonably safe, while others have become very popular in recent years for staging sophisticated theft of digital information and electronic sabotage. It is thus preferable to subject the USB peripheral connection as a whole to an additional layer of protection, slightly like the network protecting firewall, which will impose a set of policies 512 that select which peripherals are allowed, which are banned, and which can be used in a limited or controlled manner. For example, some companies might ban the use of external USB Mass-storage devices (such as Flash drives). Others may choose to allow their use but as long as these were issued by the same company, or that every file read from or written to a Flash drive is sent to the corporate security team for inspection for possible embedded malware, or for audit purposes.

Figure 5:
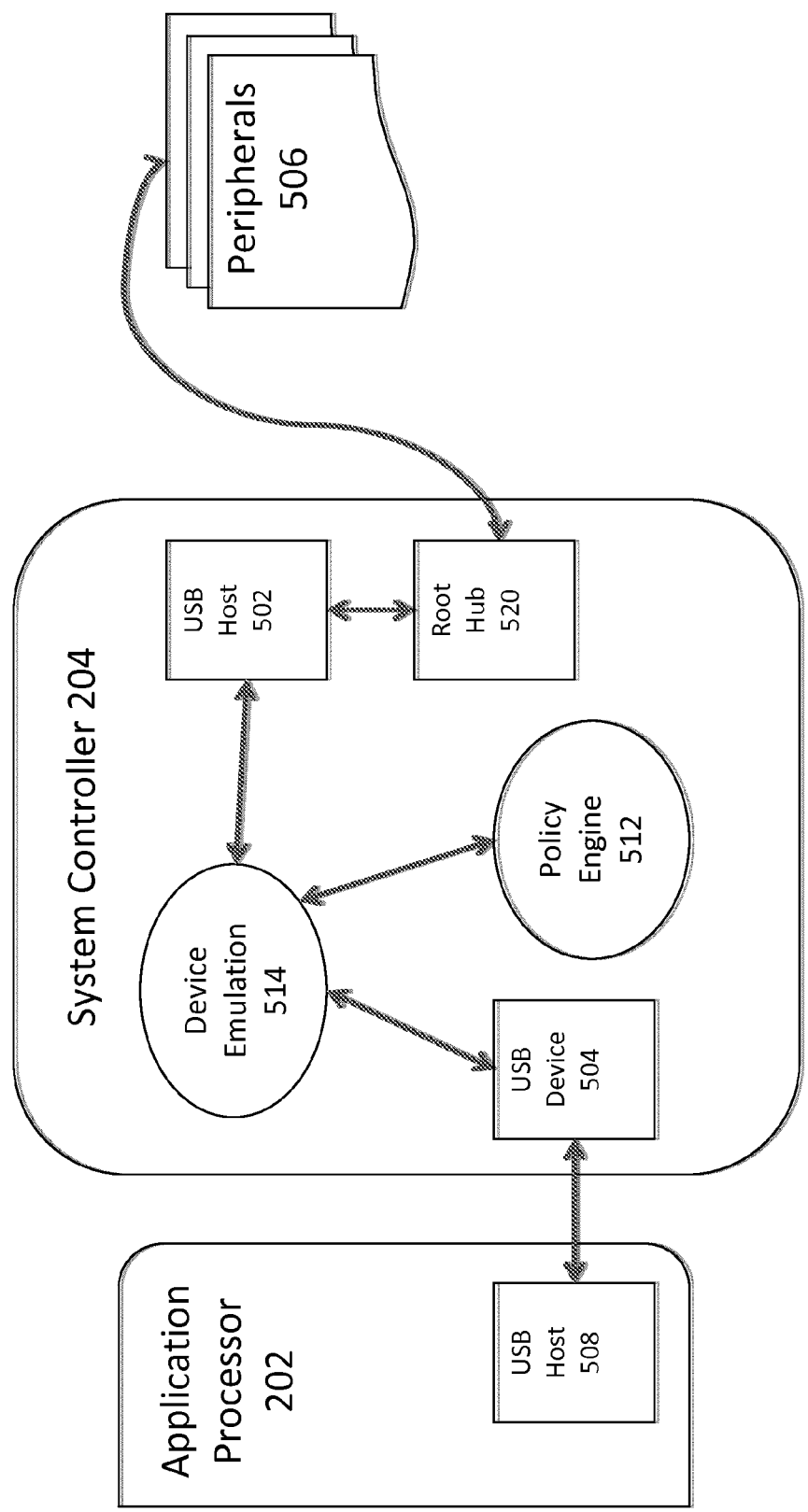
FIG. 5 is a diagram illustrating example aspects of securing application access to peripherals of a computer system according to embodiments of the invention.

In light of the above considerations, the system-processor 204 in embodiments of the invention illustrated in FIG. 5 preferably includes two USB ports, one acting as an augmented target 504, and the other a normal USB Host 502. The Host port 502 is used to connect to actual USB peripherals 506, some of which may be internal to the computer; for example, a video-conferencing camera, audio speakers and microphone, a keyboard and a touch-pad, and several standardized USB ports used to connect external peripherals.

The USB Target port 504 connects directly "back-to-back" with the standard USB port 508 present on the application-processor sub-system 202, and contains appropriate hardware resources complemented by specifically designed firmware 214 to emulate a plurality of USB peripherals. Regular USB Target controllers include enough resources to implement only a single target device, which would not suffice in this case. For the purpose of the computer architecture disclosed herein, the USB Target port 504 preferably implements more hardware resources and logic, and is capable of emulating 514 multiple (e.g. at least 8) independent USB peripherals, each with its own device address. These are enumerated by the application-processor 202 operating system USB software stack, as if there were in reality several independent USB devices connected to the application-processor 202 via a USB Hub. Since some of the actual devices that will be depended upon for providing the functionality of the emulated USB devices 514 might be of a lower speed than the maximum speed of the USB interface 508 on the application-processor 202, the USB Target port 504 will also benefit the overall system performance if it implements the logic required for USB Hubs. In other words, the resources required for the augmented USB Target port 504 correspond to the resources of a USB Hub 510 as well as several independent USB Target devices 506.

The firmware 214 of system-processor 204 complements the hardware functionality and maps each of the emulated USB peripherals 514 to one of the real USB devices 506 connected to its USB Host port 502, but does so in a way that is consistent with a set of security policies 512. These policies 512 are stored locally by firmware 214 and can be retrieved from the corporate server from time to time automatically, without user intervention. These policies 512 may allow the mapping and transparent bridging of a certain class of devices that are considered essentially harmless. Still, even the most harmless of USB devices (e.g. external mice) must be checked for the validity of their USB data structures, so that any vulnerabilities that may exist in the application operating system USB stack that could be exploited with a maliciously-crafted USB packet are protected against by engine 512.

Other USB devices may be banned by engine 512 based on their class and sub-class. Some USB devices may be allowed based on the manufacturer and model codes or even more specifically based on their serial numbers, so that for example USB Flash drives can be generally banned, while very specific Flash drives that have a built-in security shield and are furnished by the corporation would be allowed.

In some cases permitted devices will be emulated 514 with certain specific action. For example, the computer keyboard is a USB device, and should be generally allowed, except that certain key combinations should be intercepted by the system-processor 204 and not forwarded to the application-processor 202, and used to request certain system-level functions to be invoked. Another example is when an allowed USB Flash drive is required by the policy 512 to retain an audit trail. In such a case the commands to read and write data to and from the USB Flash drive would be forwarded across the system-processor's two USB ports 502, 504, but these commands along with the accompanying data would be recorded in a special file on the local drive, and subsequently submitted to the corporate server via the VPN Tunnel for storage and subsequent audit.

With the USB Target port 504 augmented with the logic on a USB hub 510, namely the support of split-transaction, the bridging can be done transparently. Split-transaction support allows the system-processor 204 to handle any command from the application-processor 202 USB stack by forwarding that same request (if permitted) to the actual real USB device 506, and then return the response when it is ready. Without using split-transaction support, it would be necessary for the firmware to prepare the response to any anticipated USB command ahead of time, and store it in the appropriate USB Target device end-point buffer, which will not always allow for sufficient transparency in the bridging between the real and emulated USB device.

In addition to the above, there will sometimes need to be a number of connections between the two sub-systems 202 and 204, including those that are needed for purely operational purposes and that have no influence on the application software and operating system. One such connection would be the ability of the system-processor subsystem 204 to control the power supply of the application-processor subsystem 202, and emulate a standard computer power supply. Another connection can control and monitor the "BIOS" low-level operational software on the application-processor 202, which is preferably done via a low-speed serial port. This would allow operational supervisory functions to be embedded with the firmware 214 of the system-processor 204, and allow remote configuration by, and reporting of the operating system bootstrap process to, the corporate server farm.

An example process of providing secure access to a computer system 100 according to embodiments of the invention will now be described in connection with FIG. 6.

Figure 6:
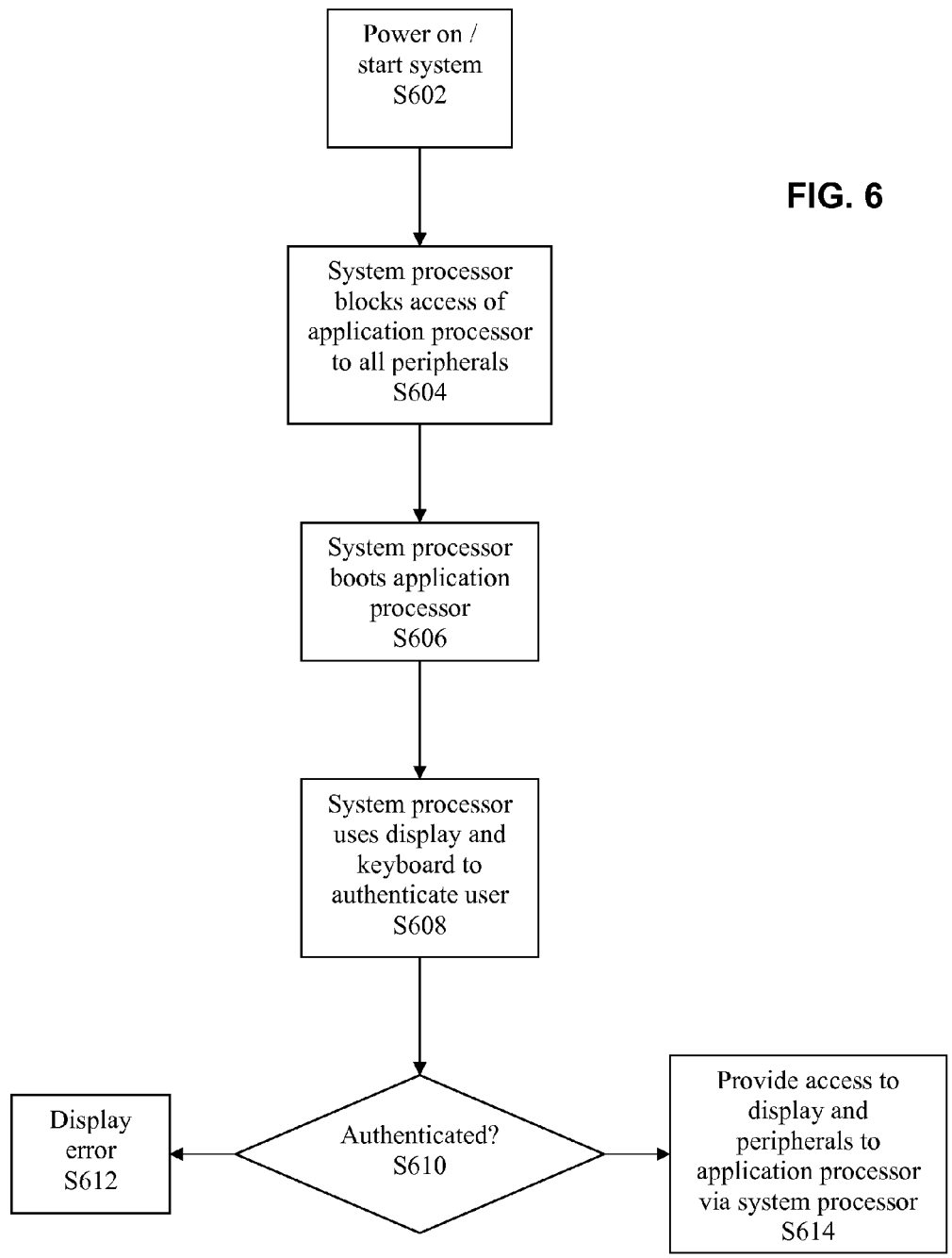
FIG. 6 is a flowchart illustrating an example process of securing a computer system according to embodiments of the invention.

As shown in FIG. 6, processing begins during initial system start-up S602, for example, when a system power on/reset button is pressed. Initially, as shown in step S604, firmware 214 operating in system processor 204 assumes total control of the system 100 and blocks access of application processor 202 to all system peripherals. For example, system processor 204 blocks access to a keyboard 206 and similar input devices such as mice. In other words, even though such peripherals are attached to the system 100, signals from them are provided only to system processor 204, and these signals are not relayed to application processor 202. Similarly, system processor 204 causes the video mux 208 to block any video outputs from application processor 202 to be shown on display 210. Meanwhile, the system processor 204 can cause the video mux 208 to display a startup screen that is output by system processor 204.

As shown in step S606, the system processor 204 can allow the application processor 202 to boot. In other embodiments, this step does not occur until after a user has been authenticated. In either event, during startup of application processor 202, system processor 204 can control access of the application processor 202 to the disk drive 410 (e.g. to allow the processor 202 to load an operating system such as Windows 7), and provide an emulated keyboard and display connection for the BIOS/operating system for application processor 202, even though such inputs and outputs are actually blocked by system processor 204.

In a next step S608, system processor 204 exclusively controls keyboard 206 (and perhaps other input devices such as touchpads, etc.), and the interactions needed to properly authenticate the user, and inform him of the progress and results of this process via display 210. As set forth above, authentication can include any conventional, proprietary or future technique, and those skilled in the art will recognize many possible alternatives. In one non-limiting example, system processor 204 can prompt a user to enter/supply credentials such as username, password, secure key, biometrics (e.g. fingerprint). These credentials can be compared to locally stored credentials, or system processor 204 can forward them to a remote authentication server for comparison.

If authentication is determined in step S610 to be unsuccessful, an error screen is displayed in step S612, and all further inputs from the user on any attached peripherals will be ignored.

Otherwise, if it is determined in step S610 that authentication is successful, the system processor 204 declares a normal operational mode in step S614, and causes video mux 208 to allow the application processor 202 graphics to take up the entire screen. Similarly, after successful authentication, processor 204 permits emulated access by processor 202 to keyboard 206 and other peripherals via bus 224 as provided by emulation functionality programmed in firmware 214. It should be noted that the "authenticated" state need not be perpetual. For example, in the event of inactivity or partial shutdown of the system, the system can lock up and return to an unauthenticated state. In this case, application processor 202, though perhaps still running, is blocked by processor 204 from accessing any peripherals, except perhaps to certain storage and networks that are needed to maintain the system in an operating state. At this point, the system processor 204 can display a logon screen and interact with a user to re-authenticate.

As another example, even while the system is in an "authenticated" state, the system processor 204 can periodically request attention of the operator by displaying a message or graphic in "overlay" mode on display 210, and enable interaction between the operator and system processor 204 by entering a pre-defined key combination on the keyboard, which will can cause a menu to popup under control of system processor 204 firmware. Such interaction can be used to adjust network settings, perform maintenance functions or invoke any other functionality built into the system processor 204 firmware, such as secure voice or video communications.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer system, comprising:
   a first subsystem including a first processor configured to run applications;
   a second subsystem including a second separate processor configured to run security firmware, wherein the second subsystem is implemented as an embedded system containing the second processor and the security firmware such that the security firmware is not accessible to the first processor or any other entities outside the embedded system; and
   peripherals connected to the second subsystem, wherein access to the peripherals by the applications is controlled by the security firmware running on the second processor, wherein the peripherals include a disk drive for storing software that the first processor accesses to run the applications, and wherein the security firmware running on the second processor is configured to prevent access by the first processor to the software on the disk drive, and wherein the security firmware running on the second processor is further configured to control a boot sequence of the first processor while access to the software for running the applications on the disk drive is being prevented, and wherein the boot sequence includes loading an operating system for the first processor.

2. The computer system of claim 1, wherein the peripherals further include a video display, the computer system further comprising:
   a video multiplexer having a first input connected to the first subsystem, a second input connected to the second subsystem, and an output connected to the video display, the selection of content from the first input and the second input for driving the output being controlled by the security firmware running on the second processor.

3. The computer system of claim 2, wherein the peripherals further include a keyboard, the security firmware including a startup sequence wherein the keyboard and the output for the video display are exclusively controlled by the second processor, wherein access to the keyboard and video display by the first processor is prevented.

4. The computer system of claim 1, further comprising:
   an emulated disk drive maintained by the security firmware, wherein access to the disk drive by the first processor is controlled via the emulated disk drive.

5. The computer system of claim 4, wherein the security firmware maintains one or more time-specific images of the emulated disk drive.

6. The computer system of claim 1, wherein the peripherals further include a network connection, wherein the security firmware controls access to an external network by the first subsystem.

7. The computer system of claim 6, further comprising a VPN tunnel maintained by the security firmware for all communications between the first subsystem and the external network.

8. The computer system of claim 1, wherein the first and second subsystems are both integrated together on a motherboard in a notebook computer.

9. The computer system of claim 1, wherein the first and second subsystems are both integrated together on a motherboard in a desktop computer.

10. The computer system of claim 1, wherein the security firmware running on the second processor is further configured to permit access by the first processor to the software on the disk drive for running the applications after successful authentication of a user of the computer system.

11. The computer system of claim 1, wherein the second subsystem is further configured to allow the first processor to access the software for running the applications on the disk drive by providing a target interface for interacting with a disk drive controller of the first subsystem.

12. A method of securing a computer system, comprising:
   configuring a first subsystem of the computer system including a first processor to run applications;
   configuring a second subsystem of the computer system including a second separate processor to run security firmware, wherein configuring the second subsystem includes implementing the second subsystem as an embedded system containing the second processor and the security firmware such that the security firmware is not accessible to the first processor or any other entities outside the embedded system;
   connecting peripherals to the second subsystem; and
   selectively controlling access to the connected peripherals by the applications using the security firmware running on the second processor,
   wherein the peripherals include a disk drive for storing software that the first processor accesses to run the applications, and wherein selectively controlling access includes configuring the security firmware running on the second processor to control a boot sequence of the first processor while access to the software for running the applications on the disk drive is being prevented, and wherein the boot sequence includes loading an operating system for the first processor.

13. The method of claim 12, wherein the peripherals further include a video display, the method further comprising:
   providing a video multiplexer in the computer system;
   connecting a first input of the video multiplexer to the first subsystem;
   connecting a second input connected of the video multiplexer to the second subsystem;
   connecting an output of the video multiplexer to the video display;
   controlling the selection of content from the first input and the second input for driving the output being using the security firmware running on the second processor.

14. The method of claim 13, wherein the peripherals further include a keyboard, the method further comprising:
   executing a startup sequence using the security firmware wherein the keyboard and the output for the video display are exclusively controlled by the second processor, wherein access to the keyboard and video display by the first processor is prevented.

15. The method of claim 12, further comprising:
   maintaining an emulated disk drive using the security firmware, wherein access to the software on the disk drive by the first processor is controlled via the emulated disk drive.

16. The method of claim 13, further comprising:
   maintaining one or more time-specific images of the emulated disk drive using the security firmware.

17. The method of claim 12, wherein the peripherals further include a network connection, the method further comprising:
   controlling, using the security firmware, all access to an external network by the first subsystem.

18. The method of claim 17, further comprising:
   maintaining, using the security firmware, a VPN tunnel for all communications between the first subsystem and the external network.

19. The method of claim 12, wherein selectively controlling access includes configuring the security firmware running on the second processor to prevent access by the first processor to the software on the disk drive.

20. The method of claim 12, further comprising allowing the first processor to access the software for running the applications on the disk drive by configuring the second subsystem to provide a target interface for interacting with a disk drive controller of the first subsystem.

* * * * *